Dec. 4, 1962  R. E. SCHMECK ETAL  3,066,789
ENDLESS CONVEYOR
Filed Oct. 5, 1959  4 Sheets-Sheet 1

INVENTORS
Robert E. Schmeck
Robert E. Mersereau
BY
William W. Jolson Jr.
ATTORNEY INVENTORS
Robert E. Schmeck
Robert E. Mersereau
BY
William W. Jolton jr.
ATTORNEY

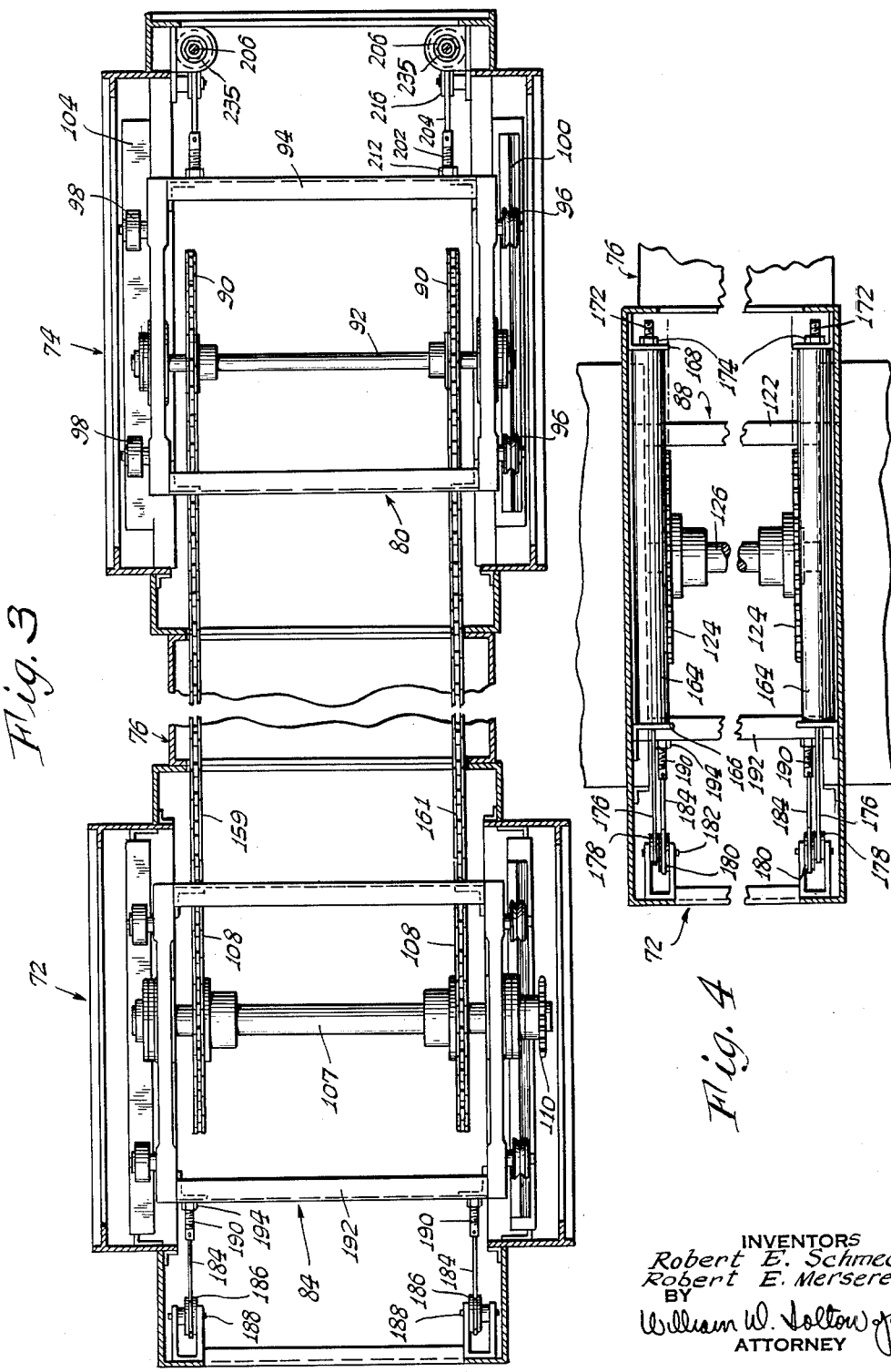

Dec. 4, 1962   R. E. SCHMECK ETAL   3,066,789
ENDLESS CONVEYOR
Filed Oct. 5, 1959   4 Sheets-Sheet 4
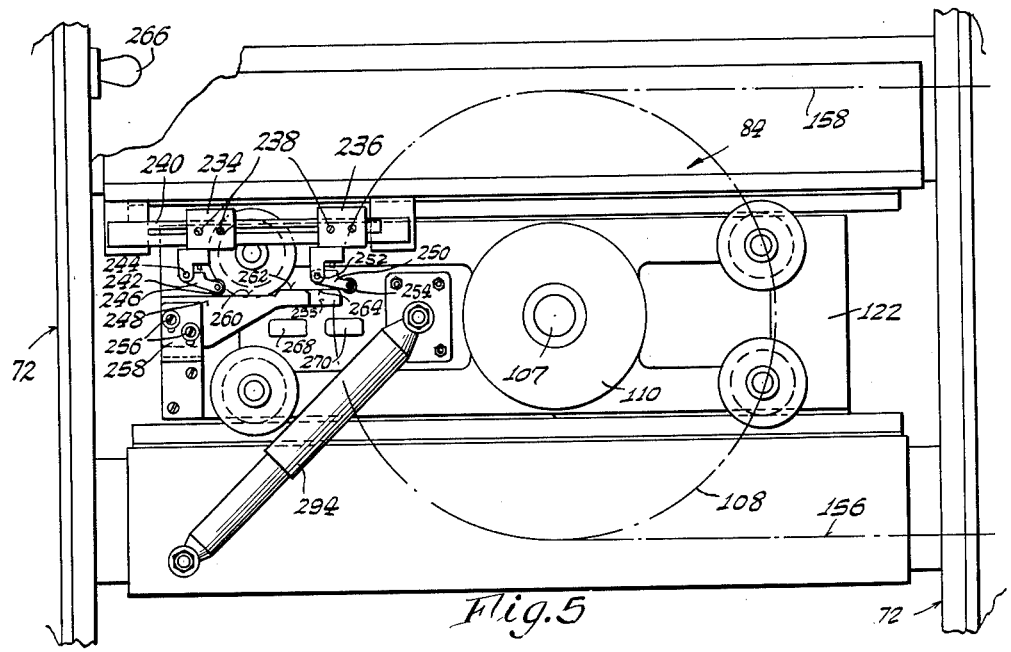
Fig. 5
Fig. 6
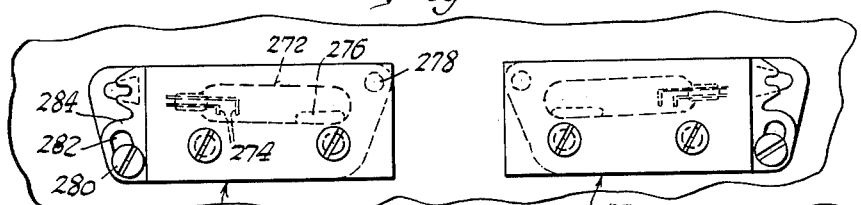
Fig. 8
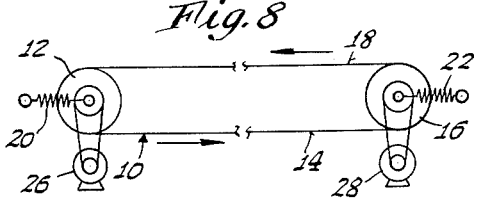
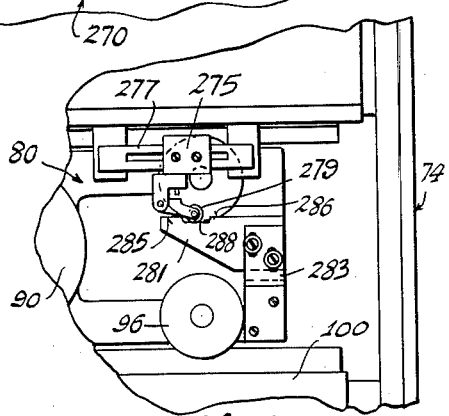
Fig. 7
Fig. 9
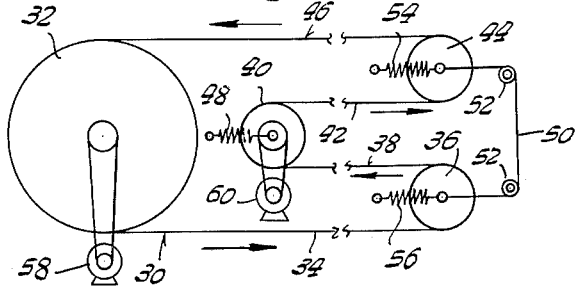
INVENTORS
Robert E. Schmeck
Robert E. Mersereau
BY
William W. Solton Jr.
ATTORNEY

United States Patent Office 3,066,789
Patented Dec. 4, 1962

3,066,789
ENDLESS CONVEYOR
Robert E. Schmeck, Riverside, and Robert E. Mersereau, Rowayton, Conn., assignors to Pitney-Bowes, Inc., Stamford, Conn., a corporation of Delaware
Filed Oct. 5, 1959, Ser. No. 844,476
3 Claims. (Cl. 198—208)

This invention relates to movable endless conveyors.

One problem which arises in the art of movable endless conveyors is that of protecting against the damaging effects of a jam occurring at a location along the length of the conveyor. By way of example, such a jam would occur if a foreign object such as a workman's tool were inadvertently left at a place from which it was dislodged to a location between a part of the moving conveyor and a fixed part of the frame supporting the conveyor. The quicker that such a jam is sensed and the quicker that movement of the conveyor is stopped (by means other than the jam itself) in response to sensing of the jam, the less, of course, will be the resulting damage. With the present invention, sensing of a conveyor jam and stopping of the conveyor movement in response thereto are rapidly effected thereby protecting the conveyor and structure associated therewith against excessive damage due to the jam. This damage would include not only the bending and breaking of parts at the jam but also that resulting from buckling of the conveyor due to the accumulation of slack in the conveyor rearwardly of the jam.

Other problems involved in the endless conveyor art are those of establishing and maintaining proper tension on the conveyor and protecting against undue stretching of the conveyor. The present invention accommodates these and other problems as will become apparent as the description proceeds.

Accordingly, an object of this invention is to provide an improved arrangement which alleviates the ill effects and resulting damage to a movable endless conveyor when a jam occurs at a location along the conveyor.

A further object of this invention is the provision of an improved arrangement for tensioning a movable endless conveyor. Another object is the provision of such an arrangement which maintains said conveyor under a substantially constant tension regardless of lengthening or shortening of the conveyor. A further object of the invention is to provide such an arrangement which is effective to signal the condition whereby the conveyor has stretched to a predetermined, limited extent.

Further objects and advantages will become apparent as the description proceeds.

Several embodiments of the invention are shown in the accompanying drawings wherein.

Figure 2:
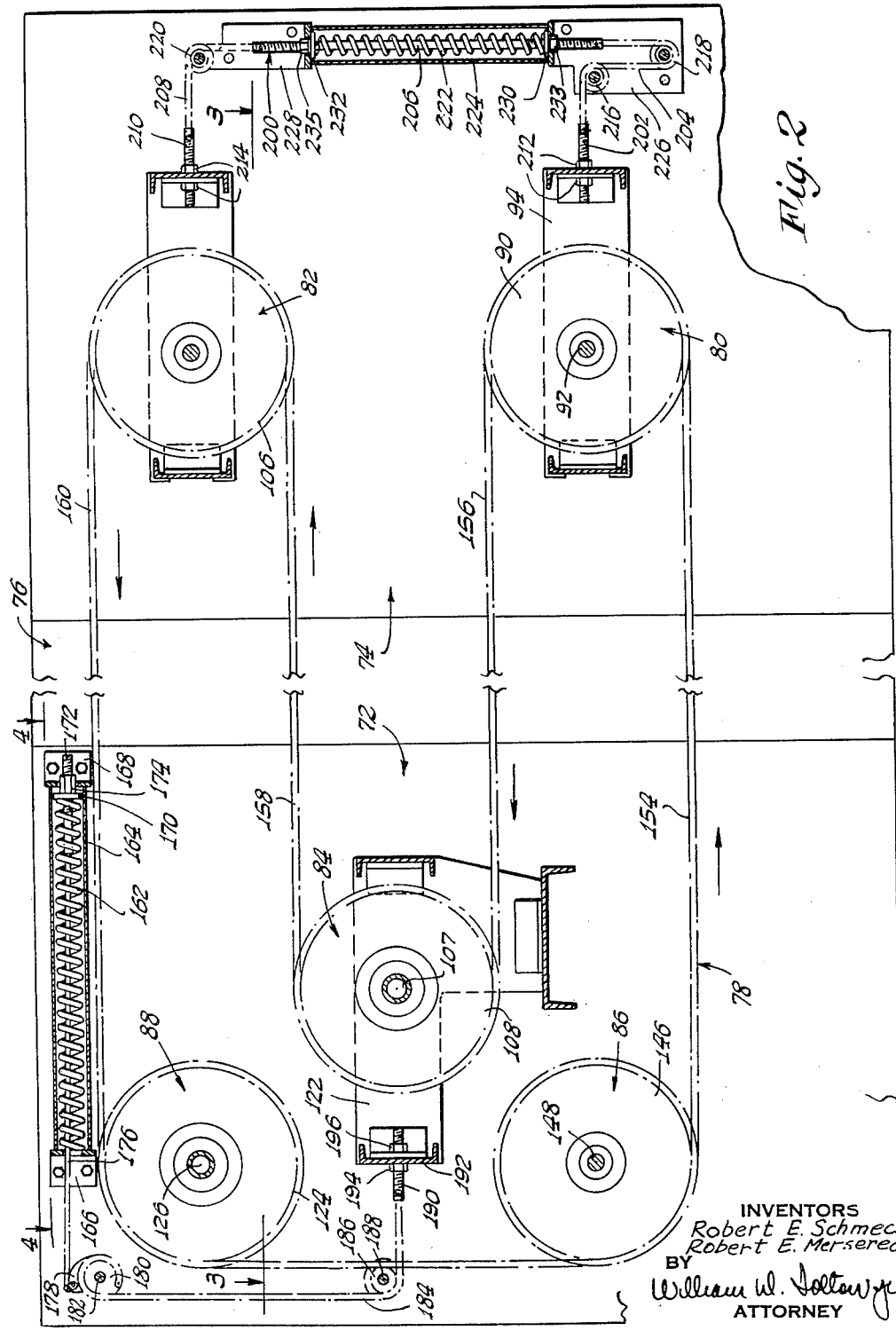
FIG. 2 is a view similar to FIG. 1 but with parts of the supporting frame being omitted to clearly show the means by which several of the conveyor-mounting wheel means are resiliently biased against linear movement relative to the supporting frame.

FIGS. 3 and 4 are sectional views taken along lines 3—3 and 4—4, respectively, in FIG. 2;

FIG. 5 is a fragmentary, side elevational view on an enlarged scale and showing one of the linearly movable wheel means, this view also including electrical switch means associated with this wheel means for effecting the quick stopping of conveyor movement upon the occurrence of a conveyor jam, and for signalling that undue lengthening of the conveyor has occurred;

FIG. 6 is a fragmentary, side elevational view showing a portion of said switch means for de-energizing the conveyor-driving means and for energizing the conveyor-braking means, this view being on a scale enlarged over that of FIG. 5;

FIG. 7 is a fragmentary, side elevational view of the electrical switch means associated with another one of the linearly movable wheel means for de-energizing the conveyor-driving means and energizing the conveyor-braking means upon the occurrence of a conveyor jam, this view being on the same scale as that of FIG. 5; and FIGS. 8 and 9 are respective schematic representations of endless conveyors according to two other embodiments of the invention.

Referring to the schematic showing of FIG. 8, a simplified embodiment according to the present invention includes an endless conveyor generally indicated at 10 and which is movable along a closed path as indicated by the arrows in this figure. This closed path extends from a wheel means 12 along a first conveyor reach 14 to a second wheel means 16, then about the latter and along a second conveyor reach 18 and back to wheel means 12. Each of wheel means 12 and 16 is mounted for linear movement relative to the supporting frame for the conveyor and in the opposite directions designated by the arrows in FIG. 8. A spring means 20 is provided for resiliently biasing wheel means 12 to the left as viewed in this figure, thereby to place conveyor 10 under tension. In a manner that will be more particularly described later in this description, spring means 20 exerts a constant force on wheel means 12 regardless of displacement of the latter in either of said opposite directions. Such displacement could occur to the left as viewed in this figure due, for example, to stretching of the conveyor 10 as normally occurs with many if not most endless conveyors as they wear with continued use. Said displacement could occur to the right when, for example, one or more sections of the conveyor are removed for the purpose of shortening the length of the conveyor after excessive stretching thereof has occurred. Wheel means 16 is resiliently biased to the right by a tension spring means 22. Spring means 22 has the conventional characteristic of exhibiting an increased force with deflection in the direction to tension that spring means. Spring means 22 will be deflected or distended by the action of spring means 20 to the extent that the force exerted on wheel means 16 by spring means 22 will be equal to and balance that exerted by spring means 20 on wheel means 12. Consequently, wheel means 16 assumes a neutral position along the linear path in which it is movably supported by the frame for the conveyor. With this arrangement it will be apparent that any change in the length of conveyor 10 will be accommodated by linear movement of wheel means 12 in the appropriate direction. For example, any increase in the length of conveyor 10 due to stretching thereof will be taken up by leftward movement of wheel means 12. The tension on conveyor 10 as well as the above-described balance of forces and the neutral position of wheel means 16 will remain unchanged, however, because spring means 20 exerts a constant force on wheel means 12 regardless of linear displacement of the latter. Wheel means 12 is provided with electrical switch means (not shown in FIG. 8) which is effective to energize signalling means when displacement of wheel means 12 to the left approaches an allowable limit, thereby protecting against excessive stretching of the conveyor.

Wheel means 12 is also provided with electrical switch means (not shown in FIG. 8) which is effective to de-energize the means for driving conveyor 10 and to operate braking means to stop movement of the conveyor when substantial linear movement of wheel means 12 occurs to the right. Wheel means 16 is somewhat similarly provided with electrical switch means (not shown in FIG. 8) which is effective to de-energize and operate the driving and braking means, respectively, of the conveyor whenever substantial linear displacement of wheel means 16 takes place to the left.

Each of wheel means 12 and 16 is rotatably driven to drive conveyor 10. For this purpose a motor 26 is operatively connected to rotate wheel means 12 and a motor 28 is operatively connected to rotate wheel means 16. By rotatably driving both of wheel means 12 and 16, difficulties in starting and otherwise accelerating the movement of conveyor 10 are avoided such as would occur if only one of these wheel means were to be rotatably driven. If only wheel means 12 were rotatably driven, for example, the pull on conveyor reach 18 by wheel means 12 when motor 26 was started would cause wheel means 16 to move to the left due to the inertia of conveyor reach 14 and the rotational inertia of wheel means 16. Such leftward movement of wheel means 16 would cause unintended stopping of the conveyor. The same unintended result would occur if only wheel means 16 were rotatably driven. With both of wheel means 12 and 16 being rotatably driven, the simultaneous starting of motors 26 and 28 would cause the pull on conveyor reach 14 by wheel means 16 to be balanced by the pull on conveyor reach 18 by wheel means 12. The alternative of driving only one of wheel means 12 and 16 with such a slow rate of acceleration as to avoid unintended displacement of the other wheel means has the disadvantage of requiring a prolonged length of starting time to bring the conveyor up to speed.

Operation of the arrangement schematically shown in FIG. 8 to alleviate the damage due to a conveyor jam will now be described. If a jam should occur at a point along conveyor reach 14, the result would be leftward linear movement of wheel means 16. This linear movement of wheel means 16 is the resulting effect of a number of factors, several of which would tend to cause this leftward movement and several of which would tend to prevent this leftward movement. The factors tending to cause this leftward movement are always greater than those tending to prevent it, with the result that the occurrence of such a jam along conveyor reach 14 always results in a substantial amount of this leftward linear movement of wheel means 16. These factors include the inertia of the conveyor, the rotational inertia of both of wheel means 12 and 16, the rotational inertia of the armature of each of motors 26 and 28, the driving force exerted on conveyor 10 by the armature of each of motors 26 and 28, the force exerted on wheel means 16 by spring means 22 and the linear inertia of wheel means 16. Since the rotational inertia and the driving force of the armature of each of the motors always act in the same direction, the combination or sum of these two forces of each armature will hereinafter be referred to as the armature force of the respective motor. By way of example, the linear inertia of wheel means 16 and the force exerted by spring means 22 would tend to prevent leftward linear movement of wheel means 16 upon the occurrence of a jam along conveyor reach 14. Further by way of example, the inertia of the conveyor, the rotational inertia of both of wheel means 12 and 16, and the armature force of both of wheel means 12 and 16 would tend to effect leftward linear movement of wheel means 16 under the same conditions. The forces tending to cause this leftward movement always being greater than those tending to prevent it (the design parameters being so chosen), the result is that wheel means 16 is displaced to the left whereby the above-mentioned switch means associated with wheel means 16 is tripped to de-energize motors 26 and 28 and to operate means for quickly braking conveyor 10 to a stop. It will therefore be apparent that the occurrence of a jam at a point along conveyor 10 between the ends of conveyor reach 14 will result in the rapid stopping of the conveyor thereby minimizing the damage due to the jam.

When a jam occurs along conveyor reach 18, wheel means 12 will be moved to the right to trip its switch means whereby movement of conveyor 10 will be quickly stopped. In this regard, the factors tending either to cause wheel means 12 to move linearly to the right upon the occurrence of a jam along conveyor reach 18 are the inertia of the conveyor, the armature forces of motors 26 and 28, and the rotational inertia of wheel means 12 and 16. The linear inertia of wheel means 12 tends, of course, to prevent this rightward movement of wheel means 12. The former always being greater than the latter, the overall effect of these factors is to cause rightward linear movement of wheel means 12 whereby the above-mentioned switch means associated with wheel means 12 is tripped to de-energize motors 26 and 28 and to operate means for quickly braking conveyor 10 to a stop.

When a jam occurs along either of conveyor reaches 14 and 18, the resulting damage to the conveyor and the associated structure includes not only that at the jam but also that due to excessive slack building up rearwardly of the jam. This build-up of slack, if excessive, could cause buckling of the conveyor resulting in further damage. By quickly stopping the movement of the conveyor upon the occurrence of a jam, this further damage is also minimized.

It will be clear that conveyor 10 can be driven by motors 26 and 28 in its closed path in the opposite direction from that indicated by the arrows in FIG. 8. In this event, the arrangement depicted in FIG. 8 would be effective, in protecting against damage due to a jam, in the same way but oppositely so from that described above. That is, for example, with the direction of movement of conveyor 10 reversed, a jam along conveyor reach 14 would result in rightward movement of wheel means 12 (rather than leftward movement of wheel means 16) to effect rapid stopping of the conveyor.

Referring to the schematic showing of FIG. 9, another embodiment of the present invention includes an endless conveyor generally indicated at 30 and which is movable, in the direction indicated by the arrows in this figure, along a closed path leading from a wheel means 32 along a first conveyor reach 34 to a second wheel means 36, about the latter and along a second conveyor reach 38 to a third wheel means 40, about the latter and along a third conveyor reach 42 to a fourth wheel means 44, and then about the latter and along a fourth conveyor reach 46 and subsequently back to wheel means 32. The axis of rotation of wheel means 32 is fixed relative to the supporting frame of the conveyor whereas each of wheel means 36, 40 and 44 is mounted for linear movement relative to the supporting frame in the same opposite directions as those designated by the arrows in this figure. A spring means 48 is provided for resiliently biasing wheel means 40 to the left as viewed in this figure, thereby to place conveyor 30 under tension. In a manner more particularly described later in this description, spring means 48 exerts a constant force on wheel means 40 regardless of displacement of the latter in either of said opposite directions. The force exerted on wheel means 36 and 44 due to spring means 48 is resisted by a coupling 50 with a force equal but opposite to that exerted by spring means 48. Coupling 50 acts in the nature of a whiffle-tree in that any movement of one of wheel means 36 and 44 to the left is accompanied by an equal amount of movement of the other one of these two wheel means to the right. In this regard, coupling 50 is flexible, at least adjacent a pair of pulley wheels 52, 52 about which the coupling is trained and, the coupling being connected to one of wheel means 36 and 44 at each end thereof, the above described whiffle-tree action is obtained. Each of wheel means 36 and 44 is resiliently biased to the left by a spring means 54 and 56, respectively. Each of spring means 54 and 56 resiliently biases the wheel means to which it is connected with a force equal to that of the other and against movement of that wheel means to the right from a neutral position as shown in this figure. It will be clear that, by virtue of coupling 50, wheel means 44 is resiliently biased to the right by spring means 56 and wheel means 36 is resiliently biased to the right by spring means 54. Consequently, each of wheel means 36 and 44 assumes a neutral position along the linear path in which it is movably supported by the frame for the conveyor.

With this arrangement, any change in the length of conveyor 30 will be accommodated by linear movement of wheel means 40 to the left or right as the case may be. The tension on conveyor 30 as well as the above-described balance of forces and the neutral positions of wheel means 36 and 44 will remain unchanged, however, because spring means 48 exerts a constant force on wheel means 40 regardless of linear displacement of the latter.

Wheel means 40 is provided with electrical switch means identical to that with which wheel means 12 of FIG. 8 is provided. In this regard, when displacement of wheel means 40 to the left approaches the allowable limit, this switch means is tripped thereby stopping movement of the conveyor 30. This switch means will cause stopping of the conveyor if and when excessive stretching of the conveyor has occurred. In addition, this switch means is effective to de-energize the means for driving the conveyor and to operate braking means quickly to stop movement of the conveyor when substantial rightward linear movement of wheel means 40 occurs. Either one of wheel means 36 and 44 is provided with electrical switch means which is effective to de-energize and operate the driving and braking means, respectively, of the conveyor whenever substantial linear displacement of that one of wheel means 36 and 44 takes place to the right or left. This latter switch means is provided on only one of wheel means 36 and 44 because displacement of each of these wheel means is accompanied by an equal amount of movement of the other as noted above.

Each of wheel means 32 and 40 is rotatably driven to drive conveyor 30 about its closed path. For this purpose a motor 58 is operatively connected to rotate wheel means 32 and a motor 60 is operatively connected to rotate wheel means 40. Wheel means 36 and 44 are idlers. The length of conveyor 30 in the direction of its movement from wheel means 40 to wheel means 32 is equal to the length of the conveyor in the direction of its movement from wheel means 32 to wheel means 40. With this arrangement difficulties are avoided in starting and otherwise accelerating the movement of conveyor 30 such as would occur, for example, if only one of wheel means 32 and 40 were to be rotatably driven. If only wheel means 40 were rotatably driven, starting of motor 60 would cause wheel means 40 to move suddenly to the right, the pull on conveyor reach 38 by wheel means 40 would cause wheel means 36 to move to the left, and the movement of wheel means 36 to the left would cause wheel means 44 to move to the right. This displacement of these wheel means would cause unintended stopping of the conveyor. The same unintended result would occur if only wheel means 32 were rotatably driven. With both of wheel means 32 and 40 being rotatably driven, the simultaneous starting of motors 58 and 60 would cause the pull on conveyor reach 38 by wheel means 40 to be balanced by the pull on conveyor reach 46 by wheel means 32.

In those cases where the inertia of the conveyor at reaches 34, 38, 42 and 46 is comparatively great (due to the mass and/or the speed at which the conveyor is run) all four of wheel means 32, 36, 40 and 44 can be separately driven by its own respective motor. Where, as here, stopping of the conveyor in response to the occurrence of a conveyor jam is effected by dynamic braking means associated with each of the driving motors, the stopping as well as the starting forces applied to the conveyor by the motors are more evenly distributed throughout the length of the conveyor.

Operation of the above-described arrangement to minimize the damage due to a conveyor jam will now be described with reference to the schematic showing of FIG. 9. If a jam should occur at a point along conveyor reach 34, the factors tending either to cause leftward linear movement of wheel means 36 or to prevent this leftward movement would include the inertia of the conveyor 30, the rotational inertia of the several wheel means 32, 36, 40 and 44, the armature force of each of motors 58 and 60, the force exerted by spring means 54 on wheel means 36 and the linear inertia of wheel means 36 and 44. The resultant of the factors tending to cause leftward linear movement of wheel means 36 upon the occurrence of a jam along conveyor reach 34 are greater than those tending to prevent this leftward movement with the result that wheel means 36 is displaced to the left whereby the above-described switch means associated with wheel means 36 trips to de-energize motors 58 and 60 and to operate the means for quickly braking conveyor 30 to a stop. It will therefore be apparent that the occurrence of a jam at a point along conveyor 30 between the ends of conveyor reach 34 results in the rapid stopping of the conveyor thereby minimizing the damage due to the jam.

When wheel means 36 moves to the left as described above due to a jam along conveyor reach 34, wheel means 44 is moved to the right by virtue of coupling 50. It will be seen that this rightward linear movement of wheel means 44 has the effect of decreasing the rate at which slack builds up in the conveyor rearwardly of the jam.

In a manner analagous to that described above with respect to the occurrence of a jam along conveyor reach 34 whereby wheel means 36 moves linearly to the left, a jam along conveyor reach 38 causes linear movement of wheel means 40 to the right and a jam along conveyor reach 42 causes linear movement of wheel means 44 to the left. This linear movement of wheel means 40 or 44 to the right and left, respectively, triggers the switch means associated therewith to de-energize both of motors 58 and 60 and to operate the means for quickly braking the conveyor to a stop. It will be noted that the leftward movement of wheel means 44 due to the occurrence of a jam along conveyor reach 42 results, by virtue of coupling 50, in rightward linear movement of wheel means 36, and this has the effect of decreasing the rate at which slack builds up in the conveyor rearwardly of the jam.

From the above, it will be seen that whenever a jam occurs along any one of conveyor reaches 14, 18, 34, 38 and 42 of the embodiments of FIGS. 8 and 9, the respective one of wheel means 16, 12, 36, 40 and 44 which is immediately forward of the jam will be linearly moved toward the jam to trip its associated switch means thereby to cause rapid stopping of the conveyor whereby damage to the conveyor and associated parts is minimized.

Since wheel means 32 of the embodiment of FIG. 9 is fixed against linear movement to the right or left, the occurrence of a conveyor jam along reach 46 does not result in linear movement toward the jam of the wheel means next forwardly of this jam. Instead, wheel means 36, which is the linearly movable wheel means next forwardly of a jam along reach 46, responds by moving linearly toward the jam (along the path of the conveyor) whereby the conveyor is quickly braked to a stop. The disadvantage that the wheel means 32 next forwardly of a jam along reach 46 is not linearly movable is compensated by the fact that it is a comparatively simple matter to protect against a jam along conveyor reach 46 because overhead means such as cover plates can be mounted above reach 46 without interference with the rest of the conveyor. Such overhead means would shield conveyor reach 46 against foreign objects being inadvertently dropped onto this conveyor reach. An advantage of so fixing wheel means 32 against linear movement is that the linear stability of the conveyor as a whole is improved. If desired, however, excessive damage due to a jam along conveyor reach 46 could be protected against by mounting wheel means 32 for linear movement to the left and right, and by resiliently biasing this wheel means in the same manner as that described above with respect to wheel means 16 in FIG. 8.

Ordinarily at least, the mass of the conveyor is kept to a minimum. It will be noted, however, that even if the inertia of the conveyor should be comparatively large (due to its mass and/or its speed being comparatively large), the result, whereby the respective linearly movable wheel means next forwardly of a conveyor jam moves linearly toward the jam, will still be attained and with correspondingly greater effect because the greater the inertia of the conveyor (all other factors remaining unchanged) the greater will be the resultant force acting to effect this linear movement of the wheel means next forwardly of the jam.

It is to be recognized that the respective linearly movable wheel means of both of FIGS. 8 and 9 act in another way to alleviate damage to the conveyor and associated parts due to a jam; namely, by yielding to the forces tending to move these wheel means linearly rather than unyieldingly opposing these forces as would be the case if these wheel means were fixed against linear movement. By virtue of this yielding action, breaking, undue stretching and other damage to the conveyor and associated parts, as would otherwise occur, is prevented.

The operation of the endless conveyor embodiment of FIGS. 1–7 in responding to the occurrence of a conveyor jam and to a change in the length of the conveyor is identical to that described above with respect to the schematically depicted embodiment of FIG. 9. The several structural differences presented by the embodiment of FIGS. 1–7 over the embodiment of FIG. 9 will be specifically pointed out in the course of the following detailed description of the embodiment of FIGS. 1–7.

Figure 1:
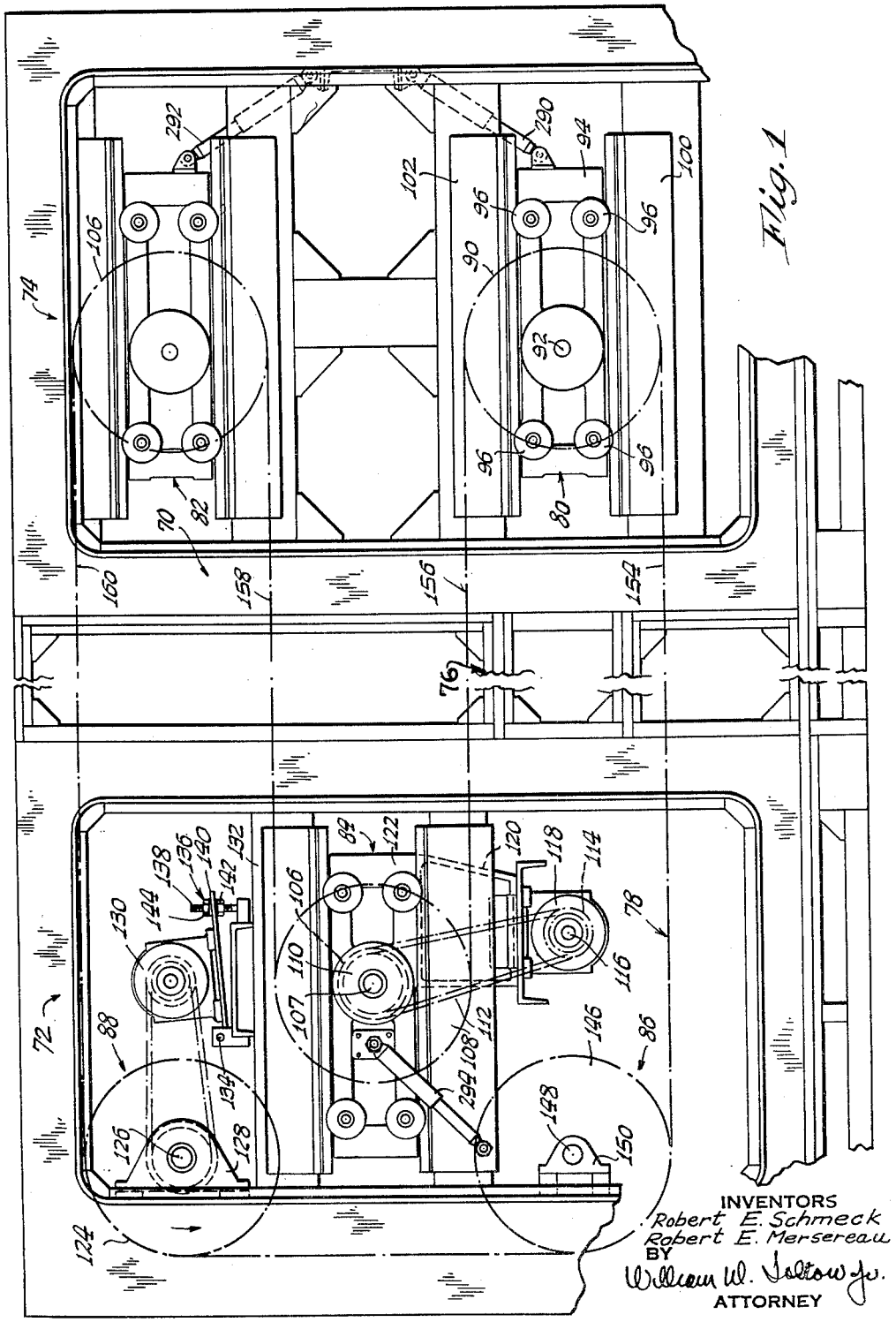
FIG. 1 is a side elevational view, broken away in part, of an endless conveyor and its supporting frame according to one embodiment of the invention.

Referring particularly to FIG. 1, the supporting frame for the conveyor according to this embodiment is modular in form and is generally designated by the reference numeral 70. Frame 70 includes two end modules 72 and 74, respectively, with and between which are integrated as many identical intermediate frame modules 76 as are required to accommodate the length of the particular conveyor. The endless conveyor according to this embodiment is generally designated at 78, and for details of the structure and function of this conveyor in addition to those described herein, reference is hereby made to copending U.S. patent application Serial No. 786,134 to E. W. Tangard, filed January 12, 1959. Conveyor 78 is supported by five wheel means generally designated at 80, 82, 84, 86 and 88, respectively. Wheel means 80 and 82 are supported by end module 74 and correspond to wheel means 36 and 44, respectively, of the embodiment shown in FIG. 9. Wheel means 84, 86 and 88 are supported by end module 72. Wheel means 84 corresponds to wheel means 40 of the FIG. 9 embodiment. Wheel means 86 and 88 correspond to wheel means 32 of the FIG. 9 embodiment. The provision of two wheel means 86 and 88 has the advantages that less space is taken up thereby and less mass is involved therewith as compared with the provision of the single wheel means 32 of FIG. 9.

Wheel means 80 comprises a pair of laterally spaced sprocket wheels 90, 90 fixedly carried by a shaft 92, the latter being rotatably supported in bearings provided by a carriage 94. Carriage 94 rotatably mounts at one side thereof a plurality of V-grooved rollers 96 (see FIGS. 1 and 3) and at the other side thereof rotatably mounts a plurality of ungrooved rollers 98. End module 74 fixedly carries, at one side thereof, a pair of opposed track members 100 and 102; each of the latter providing a V-shaped trackway mating with two of the V-grooved rollers 96. At the other side of end module 74, a similar pair of opposed track members are provided, only one of which is shown in FIG. 3 at 104. The trackways provided by these latter track members are flat-faced to mate with rollers 98. In this manner, wheel means 80 is supported and guided by frame 70 for linear movement to the right and left as viewed in each of FIGS. 1 and 3. Wheel means 82, which includes a pair of laterally spaced sprocket wheels 106 (only one of which is shown in FIG. 1), is identical with wheel means 80. Wheel means 84 is identical with wheel means 80 and 82 to the extent that wheel means 80 is described above. Wheel means 84, unlike wheel means 80 and 82, includes means for driving the conveyor 78. Consequently, shaft 107 which supports sprocket wheels 108 of wheel means 84 may be somewhat larger in diameter than the corresponding shafts of wheel means 80 and 82. Shaft 107 fixedly carries a driven sprocket wheel 110 about which a sprocket chain 112 is trained. Sprocket chain 112 is in mesh with a driving sprocket wheel 114, and the latter is rotatably driven by the shaft 116 of the motor 118. Motor 118 is supported by a bracket 120. Bracket 120 is carried by a carriage 122 which rotatably supports shaft 107. It will be apparent, then, that motor 118 rotatably drives both of sprocket wheels 108, 108 which, in turn, drive conveyor 78 about its closed path.

Wheel means 88 comprises a pair of laterally spaced sprocket wheels 124, only one of which is shown in FIGS. 1 and 2. Sprocket wheels 124 are fixedly carried by shaft 126 which is rotatably supported by bearing blocks 128, 128 mounted on end module 72. Sprocket wheels 124 are rotatably driven by motor 130 in the same manner as sprocket wheels 108 are driven by motor 118, with the exception that motor 130 is mounted on a fixed frame member 132 of end module 72 whereas, as explained above, motor 118 is mounted for linear movement with sprocket wheels 108. Each of motors 118 and 130 may be mounted for pivotal movement relative to its respective supporting structure in the manner depicted for motor 130 in FIG. 1. In this connection, motor 130 is mounted for pivotal movement about a pin 134, and is locked in pivotally adjusted position by lock means 136 adjustably to tension the sprocket chain directly driven thereby. Lock means 136 is of conventional form including a threaded shank 138 along which a supporting plate 140 for motor 130 is secured by tightening nuts 142 and 144.

Motors 118 and 130 are identical, conventional, direct current, shunt wound motors matched to drive at synchronous speeds. Each of these motors is provided with conventional dynamic braking means which, when operated, is effective rapidly to stop movement of the conveyor 78.

Wheel means 86, like wheel means 80, 82 and unlike wheel means 84, 88, is an idler. In this regard, wheel means 86 includes a pair of spaced sprocket wheels 146, only one of which is shown in FIG. 1. Sprocket wheels 146 are fixedly carried by a shaft 148 which is rotatably supported by bearing blocks 150 mounted on end frame module 72.

As best seen in FIG. 2, endless conveyor 78 extends from wheel means 86 along conveyor reach 154 to wheel means 80, and about the latter and in the opposite direction along a conveyor reach 156 to wheel means 84, then about the latter and in the opposite direction along conveyor reach 158 to wheel means 82, and then about the latter and in the opposite direction along a conveyor reach 160 to wheel means 88 and subsequently back to wheel means 86. Due to the substitution of the pair of wheel means 86 and 88 for the single wheel means 32 of FIG. 9, the length of conveyor 78 from driven wheel means 88 forwardly to driven wheel means 84 is slightly greater than the length of conveyor 78 from driven wheel means 84 forwardly to driven wheel means 88. This slight imbalance, however, has only negligible effect in operation of the conveyor.

Conveyor 78, as disclosed in detail in the above-mentioned copending patent application of E. W. Tangard, includes two laterally spaced sprocket chains 159 and 161. Each of conveyor sprocket chains 159 and 161 is trained about one of the sprocket wheels of each of wheel means 80, 82, 84, 86 and 88, and a plurality of article-carrying receivers are supported by and between these conveyor sprocket chains. The arrangement whereby conveyor 78 is tensioned under the resilient bias by which wheel means 84 is urged to the left (as later described in detail) and whereby wheel means 84 is linearly movable to the right and left, all as viewed in each of FIGS. 1, 2 and 5, provides an additional advantage noted as follows. When an endless conveyor, having a pair of laterally spaced sprocket chains as disclosed herein or their equivalent, is first installed in operative position about its several respective wheel means, it is possible if not likely that the tension on one of conveyor sprocket chains will be greater than that on the other. This would result, for example, due to one of the conveyor sprocket chains being slightly longer or shorter than the other. The greater the tension on either of the conveyor sprocket chains, the greater, of course, will be the tendency for that chain to stretch due, for example, to wear at the pivotal connections between the successive links of the chain. With the above-noted arrangement, the tension on each of the conveyor sprocket chains is influenced by that on the other in that these two tensions tend to equalize. That is, when the greater stretching of the originally shorter conveyor sprocket chain results in a tension in the latter equal to that in the one which was originally longer, any tendency for either of the conveyor sprocket chains to stretch faster than the other is counteracted by a tendency of the other to wear faster due to its resulting increased tension. With an arrangement whereby the respective wheel means are rigidly mounted against such linear movement, however, the tension in each of the conveyor sprocket chains is not influenced by that in the other whereby uneven tensioning and stretching of the conveyor sprocket chains occurs. It will be apparent that with the above noted arrangement according to this invention, the sum of the respective tensions on the two conveyor sprocket chains remains constant even though one of these tensions may initially be greater than the other; this being due to the constant force exerted by the spring means which urges wheel means 84 to the left. It follows, then, that once these two tensions become equalized with continued movement of the conveyor as explained above, these tensions will remain not only equal but constant also, with subsequent continued operation of the conveyor.

Wheel means 84 is resiliently biased to the left as viewed in FIG. 2 by spring means which exerts a constant force regardless of linear displacement of wheel means 84. This spring means is provided in duplicate (see FIGS. 3 and 4) and the following description of one of these spring means applies to both. Referring to FIGS. 2–4, this spring means includes a helical compression spring 162 having the conventional characteristic of exerting an increased force with increased compression thereof. Spring 162 is enclosed within a housing 164 supported on end module 72 by brackets 166 and 168. Spring 162 is loaded between bracket 166 at one end and a washer 170 at its other end. A rod 172 extends through an aperture in washer 170, and the latter is biased by spring 162 against a nut 174 threaded on one end of rod 172. The other end of rod 172 is connected to one end of a flexible cable 176, and the other end of cable 176 is attached to a pulley wheel 178 at a point on its periphery. Pulley wheel 178 and another pulley wheel 180 are fixed on a shaft 182 which is rotatably supported by end frame module 72. Another flexible cable 184 is attached at a point on the periphery of pulley wheel 180 and extends to a pulley wheel 186. Pulley wheel 186 is rotatable about a shaft 188 which is mounted on end frame module 72. Cable 184 passes about pulley wheel 186 and is connected to a threaded rod 190. Rod 190 extends through an aperture in a frame member 192 of carriage 122 and is secured to this frame member by tightening down nuts 194 and 196.

The radius of pulley wheel 180 is constant about its periphery. Pulley wheel 178, however, has a variable radius such that the magnitude of the effective radius of this pulley wheel is inversely proportional to the magnitude of the force exerted by spring 162. That is, the increase in the force exerted by spring 162 due to compression thereof when wheel means 84 moves linearly to the right as viewed in FIG. 2, will be accompanied by a proportional decrease in the effective radius of pulley wheel 178, and vice versa. The effective radius of pulley wheel 178 at any given time is, of course, the distance from its axis of rotation to the intersection of the straight portion of cable 176 with the periphery of this pulley wheel. The effect of this arrangement is that the torque transmitted by pulley wheel 178 to shaft 182 remains constant with deflection of spring 162. Consequently, this spring means, which includes spring 162 and the above-described pulley arrangement and which corresponds to spring means 48 of FIG. 9, resiliently biases wheel means 84 to the left with a constant force regardless of linear displacement of wheel means 84. In this manner, a constant tension on conveyor 78 is maintained regardless of linear displacement of wheel means 84. Wheel means 84 is shown in FIG. 2 as being linearly displaced to the left an amount just short of the allowable limit of stretching of the conveyor.

Wheel means 80 and 82 are interconnected by a pair of couplings 200, 200 which correspond to coupling 50 of FIG. 9. Each of couplings 200 comprises the following-named, serially connected parts: a threaded rod 202, a flexible cable 204, a threaded rod 206, a flexible cable 208 and a threaded rod 210. The distal end of each rod 202 is attached to the carriage of wheel means 80 by nuts 212, 212 threaded thereon, and the distal end of each rod 210 is similarly attached to the carriage of wheel means 82 by nuts 214, 214 threaded thereon. Each flexible cable 204 is trained about pulley wheels 216 and 218, and each flexible coupling 208 is trained about a pulley wheel 220. Couplings 200, 200 act in the nature of a whiffle-tree in that leftward movement of either of wheel means 80 and 82 causes an equal amount of rightward movement of the other.

Each of wheel means 80 and 82 is resiliently biased by spring means against movement from a neutral position to the left or right. This spring means is provided in duplicate (see FIG. 3), and the following description of one applies to both. Referring to FIGS. 2 and 3, this spring means includes only a single compression spring 222 which acts on both of wheel means 80 and 82 rather than the two tension springs 54 and 56 each of which acts to bias only one wheel means 36 and 44 of the embodiment of FIG. 9 to the right. Spring 222 exhibits the conventional characteristic of exerting an increased force with an increase in compression thereof. Spring 222 is enclosed within a housing 224 supported at each end by brackets 226 and 228 mounted on end frame module 74; these brackets also supporting the respective shafts about which pulley wheels 216, 218 and 220 are rotatable. Rod 206 extends through apertures in brackets 226 and 228, through apertures in two washers 230 and 232, and through the center of spring 222. Spring 222 is pre-loaded between washers 230 and 232; each of these washers being biased by spring 222 against the respectively adjacent one of brackets 226 and 228. Each of two nuts 233 and 235 is turned in threaded engagement with rod 206 just sufficiently to bring it into engagement with the respectively adjacent one of washers 230 and 232. It will be apparent that any tendency for either of wheel means 80 and 82 to move to the left upon starting movement of the conveyor, for example, will be resisted by spring 222 to the extent of the pre-loading of the latter. The above-described spring means, which includes spring 222, resiliently biases each of wheel means 80 and 82 against movement from a neutral position to the left. By way of example, leftward linear movement of wheel means 80 causes downward movement of rod 206 (as viewed in FIG. 2) whereby nut 235 moves against washer 232 thereby moving the latter to compress spring 222. It will be noted that, as is the case with washer 170 and nut 174, each of washers 230 and 232 is confined against lateral movement.

Electrical switch means are associated with wheel means 84 to effect the functions of energizing a warning signal in response to linear displacement of wheel means 84 to the left to the position at which the allowable limit of stretching of the conveyor has occurred, and quickly stopping movement of the conveyor in response to substantial linear displacement of wheel means 84 to the right and in response to sudden linear movement of wheel means 84 to the right or left such as would be occasioned by the occurrence of a conveyor jam. Referring to FIG. 5, two electrical switches 234 and 236, respectively, are secured by means such as screws 238 in horizontally adjusted position along a supporting strap 240 fixed to end frame module 72. Switch 234 has an actuating arm 242 resiliently biased for downward pivotal movement about a pin 244 thereby to maintain a cam-follower roller 246 carried thereby against a cam surface provided by a cam plate 248. Switch 236, in like manner, has an actuating arm 250 resiliently biased for downward pivotal movement about a pin 252 thereby to maintain a cam-follower roller 254 closely adjacent a cam surface of a cam plate 255. Cam plates 248 and 255 lie in side-by-side relation and are secured by means such as screws 256 in vertically adjusted position on a supporting plate 258 which is fixedly mounted on carriage 122. The cam surface of cam plate 248 has a lower surface portion 260 and a raised surface portion 262. The cam surface of cam plate 255 has a raised cam surface portion 264. Switch 234 is operatively connected in conventional manner to energize signalling means such as an electric lamp 266 (see FIG. 5) when this switch is tripped. Switch 236 is operatively connected in a conventional manner to de-energize both of motors 118, 130 and to operate their dynamic braking means when this switch is tripped.

Each of switches 234 and 236, when its cam follower roller is in engagement with the respective one of raised cam surface portions 262, 264, will be in tripped condition. When the cam follower roller of switch 234 is in engagement with lower cam surface portion 260, this switch will be in untripped condition; and switch 236, when its cam follower roller is out of engagement with raised cam surface portion 264, will be in untripped condition. With leftward movement of wheel means 84 from the position shown in FIG. 5, as conveyor 78 gradually stretches to the allowable limit, cam follower roller 246 rides onto raised cam surface portion 262 whereby the signal light 266 is energized. This constitutes a warning that the allowable limit of stretching of conveyor 78 has been reached and that the conveyor must therefore be shortened. Any substantial linear movement of wheel means to the right, such as would be caused by the occurrence of a conveyor jam along conveyor reach 156, results in cam follower roller 254 riding onto raised cam surface portion 264. This causes rapid stopping of the conveyor movement thereby minimizing damage as explained above. It will be noted that as the conveyor stretches with continued use, switch 236 must be adjusted to the left along supporting strap 240 to maintain cam follower roller 254 closely adjacent to cam plate 255.

The switch means with which wheel means 84 is provided further includes a pair of mercury switches generally designated in FIGS. 5 and 6 by the reference numerals 268 and 270, respectively. Switches 268 and 270 are mounted on carriage 122 and are of conventional construction. Each of switches 268 and 270 is a mirror-image of the other so that a description of one will suffice for both. Taking switch 268, a sealed chamber 272 is provided within which are disposed a pair of spaced electrical contacts 274 and a quantity of mercury 276. Switch 268 is secured in pivotally adjusted position about a pin 278 by means of a screw 280 which extends first through an aperture 282 provided by a bracket 284 carried by switch 262 and then into tightened threaded engagement with a frame member of carriage 122. The adjusted pivotal position of switch 268 is such that chamber 272 is inclined in the direction downwardly from contacts 274 whereby the mercury normally lies remote from these contacts. Upon a sudden movement of wheel means 84 to the right, such as would be occasioned by a jam along conveyor reach 156, switch 268 will be tripped by the movement of the mercury 276 into circuit-closing engagement with contacts 274. Sudden movement of wheel means 84 to the left causes tripping of switch 270 in the same manner. Each of switches 268 and 270 is operatively connected in conventional manner to de-energize both of motors 118 and 130 and to operate their dynamic braking means when that switch is tripped. Switches 268 and 270 provide a safety factor in that, with any sudden movement of wheel means 84 to the right or left, one of these switches will act to stop movement of the conveyor regardless of the action of any of the other switch means.

Briefly to recapitulate, switch 234 is operable to energize a warning signal when the allowable limit of stretching of conveyor 78 is reached; switch 236 is operable quickly to stop movement of conveyor 78 when a conveyor jam causes substantial rightward linear movement of wheel means 84; and switches 268 and 270 are operable quickly to stop movement of conveyor 78 upon any sudden linear movement of wheel means 84 to the left or right.

Suitable means are associated with wheel means 80 and 82 to effect rapid stopping of conveyor 78 in response to substantial linear displacement of these wheel means such as would be occasioned by the occurrence of a conveyor jam. This switch means is provided on only wheel means 80 because, as explained above, linear displacement of either of wheel means 80 and 82 is accompanied by equal linear displacement of the other in the opposite direction. Referring to FIG. 7, an electrical switch 275 is secured in horizontally adjustable relation on a supporting strap 277 which is fixed to end frame module 74. Switch 275 is identical to switch 236 as shown in FIG. 5 and is identically operatively connected to de-energize both of motors 118, 130 and to operate their dynamic braking means when this switch 275 is tripped. The cam follower roller 279 of switch 275 is resiliently biased against the cam surface of a cam plate 281. Cam plate 281 is secured in vertically adjusted position on a bracket 283 fixed on carriage 94. The cam surface of cam plate 281 includes two raised cam surface portions 285 and 286, respectively, and a lower cam surface portion 288. When cam follower roller is disposed against lower cam surface portion 288, switch 275 is in untripped condition, and when disposed against either of raised cam surface portions 285, 286, this switch is in tripped condition. Upon substantial linear movement of wheel means 80 to the left, such as would be occasioned by a jam along conveyor reach 154, switch 275 will be tripped due to cam follower roller 279 riding onto raised cam surface portion 286. Substantial linear displacement of wheel means 80 to the right, such as would be occasioned by a jam along conveyor reach 158, would also cause tripping of switch 275, this time by cam follower roller 279 riding onto raised cam surface portion 285. In this manner, linear displacement of either of wheel means 80 and 82 to either the left or right trips switch 275 to de-energize motors 118, 130 and to operate their dynamic braking means whereby conveyor 78 is quickly stopped.

A pair of conventional shock-absorbers 290, only one of which can be seen in FIG. 1, is provided for taking-up any excessive shock due to movement of wheel means 80 to the right or left. Each of shock-absorbers 290 is pivotally connected at one end to carriage 94 and at its other end to end frame module 74. Each of wheel means 82 and 84 is provided, in this same manner, with a pair of conventional shock-absorbers 292 and 294, respectively; only one of each of which can be seen in FIG. 1. Resilient bumper means (not shown) will ordinarily be interposed between the frame 70 and each of the carriages of wheel means 80, 82 and 84, respectively, to take-up excessive shock if any of these carriages should suddenly move to its allowable limit in either direction.

Since many changes could be made in the embodiments of the invention particularly described and shown herein without departing from the scope of the invention, it is intended that these embodiments be considered as exemplary and that the invention not be limited except as warranted by the following claims.

What is claimed is:

1. In combination: a frame; a plurality of wheel means supported for rotation by said frame; an endless conveyor movable about a closed path leading from a first one of said wheel means along a first reach in one of two opposite directions to a second one of said wheel means, then about the latter and along a second reach in the other of said opposite directions to a third one of said wheel means, then about the latter and along a third reach in said one direction to a fourth one of said wheel means, and then about the latter and along a fourth reach in said other direction and subsequently back to and about said first wheel means; means operatively connected for driving said conveyor along said closed path; means mounting each of said second, said third and said fourth wheel means for movement on said frame in said opposite directions; means resiliently biasing said third wheel means in said other direction to tension said conveyor; a coupling inter-connecting said second and fourth wheel means and resisting said resilient bias so that any movement of either of said last-mentioned wheel means in said other direction is accompanied by an equal amount of movement of the other in said one direction; and means resiliently biasing each of said second and fourth wheel means against movement in said other direction from a neutral position.

2. In combination: a frame; a plurality of wheel means supported for rotation by said frame; an endless conveyor movable about a closed path leading from a first one of said wheel means along a first reach in one of two opposite directions to a second one of said wheel means, then about the latter and along a second reach in the other of said opposite directions to a third one of said wheel means, then about the latter and along a third reach in said one direction to a fourth one of said wheel means, and then about the latter and along a fourth reach in said other direction and subsequently back to and about said first wheel means; means operatively connected for driving said conveyor along said closed path; means mounting each of said second, said third and said fourth wheel means for movement on said frame in said opposite directions; means resiliently biasing said third wheel means in said other direction to tension said conveyor with a force that remains substantially constant with displacement of said last-mentioned wheel means in either of said directions whereby the conveyor remains under substantially constant tension regardless of stretching or shortening of the conveyor; a coupling interconnecting said second and fourth wheel means and resisting said resilient bias so that any movement of either of said last-mentioned wheel means in said other direction is accompanied by an equal amount of movement of the other in said one direction; and means resiliently biasing each of said second and fourth wheel means against movement in said other direction from a neutral position.

3. The combination as set forth in claim 2 including means operatively arranged for quickly stopping movement of said conveyor in response to substantial linear displacement of said third wheel means in said one direction and in response to substantial linear displacement of either of said second and fourth wheel means in said other direction.

References Cited in the file of this patent

UNITED STATES PATENTS

| | | |
|---|---|---|
| 888,765 | Stevens | May 26, 1908 |
| 1,648,330 | Smith | Nov. 8, 1927 |
| 1,774,922 | Hahnenkamm | Sept. 2, 1930 |
| 2,355,100 | Nordquist | Aug. 8, 1944 |
| 2,821,285 | Hooper | Jan. 28, 1958 |
| 2,883,037 | Lowe et al. | Apr. 21, 1959 |
| 2,951,580 | Slomer | Sept. 6, 1960 |

FOREIGN PATENTS

| | | |
|---|---|---|
| 590,625 | Great Britain | July 23, 1947 |